(12) United States Patent
Rossini

(10) Patent No.: US 7,274,564 B2
(45) Date of Patent: Sep. 25, 2007

(54) LOCKING CRADLE FOR TABLET COMPUTERS

(75) Inventor: Alfred P. Rossini, Southboro, MA (US)

(73) Assignee: Jaco, Inc., Franklin, MA (US)

( * ) Notice: Subject to any disclaimer, the term of this patent is extended or adjusted under 35 U.S.C. 154(b) by 539 days.

(21) Appl. No.: 10/874,985

(22) Filed: Jun. 23, 2004

(65) Prior Publication Data

US 2004/0257753 A1    Dec. 23, 2004

Related U.S. Application Data

(60) Provisional application No. 60/480,935, filed on Jun. 23, 2003.

(51) Int. Cl.
*H05K 7/00*    (2006.01)
(52) U.S. Cl. .................. 361/686; 361/681; 248/920
(58) Field of Classification Search ............... 361/686, 361/681; 248/920
See application file for complete search history.

(56) References Cited

U.S. PATENT DOCUMENTS

| 5,436,792 | A | * | 7/1995 | Leman et al. ............... 361/686 |
| 5,708,560 | A | * | 1/1998 | Kumar et al. ............... 361/680 |
| 5,959,287 | A | * | 9/1999 | Myers et al. ............ 235/472.02 |
| 6,101,087 | A | * | 8/2000 | Sutton et al. ............... 361/686 |
| 6,529,381 | B1 | * | 3/2003 | Schoenfish ................... 361/725 |
| 6,785,567 | B2 | * | 8/2004 | Kato ........................ 455/575.9 |
| 7,052,296 | B2 | * | 5/2006 | Yang et al. ................. 439/165 |
| 2003/0227746 | A1 | * | 12/2003 | Sato ........................... 361/686 |

* cited by examiner

*Primary Examiner*—Jayprakash Gandhi
*Assistant Examiner*—Ingrid Wright
(74) *Attorney, Agent, or Firm*—Brian M. Dingman; Mirick O'Connell DeMallie & Lougee

(57) ABSTRACT

A cradle for supporting and retaining a tablet computer having four sides, a front, and a back. The cradle has a base, projecting arms coupled to the base and located along three of the four sides of the tablet computer when the back of the computer is on the base, and one or more moveable arms that are selectively engagable along the fourth side of the tablet computer when the back of the computer is on the base, to selectively retain the tablet computer in the cradle.

17 Claims, 5 Drawing Sheets

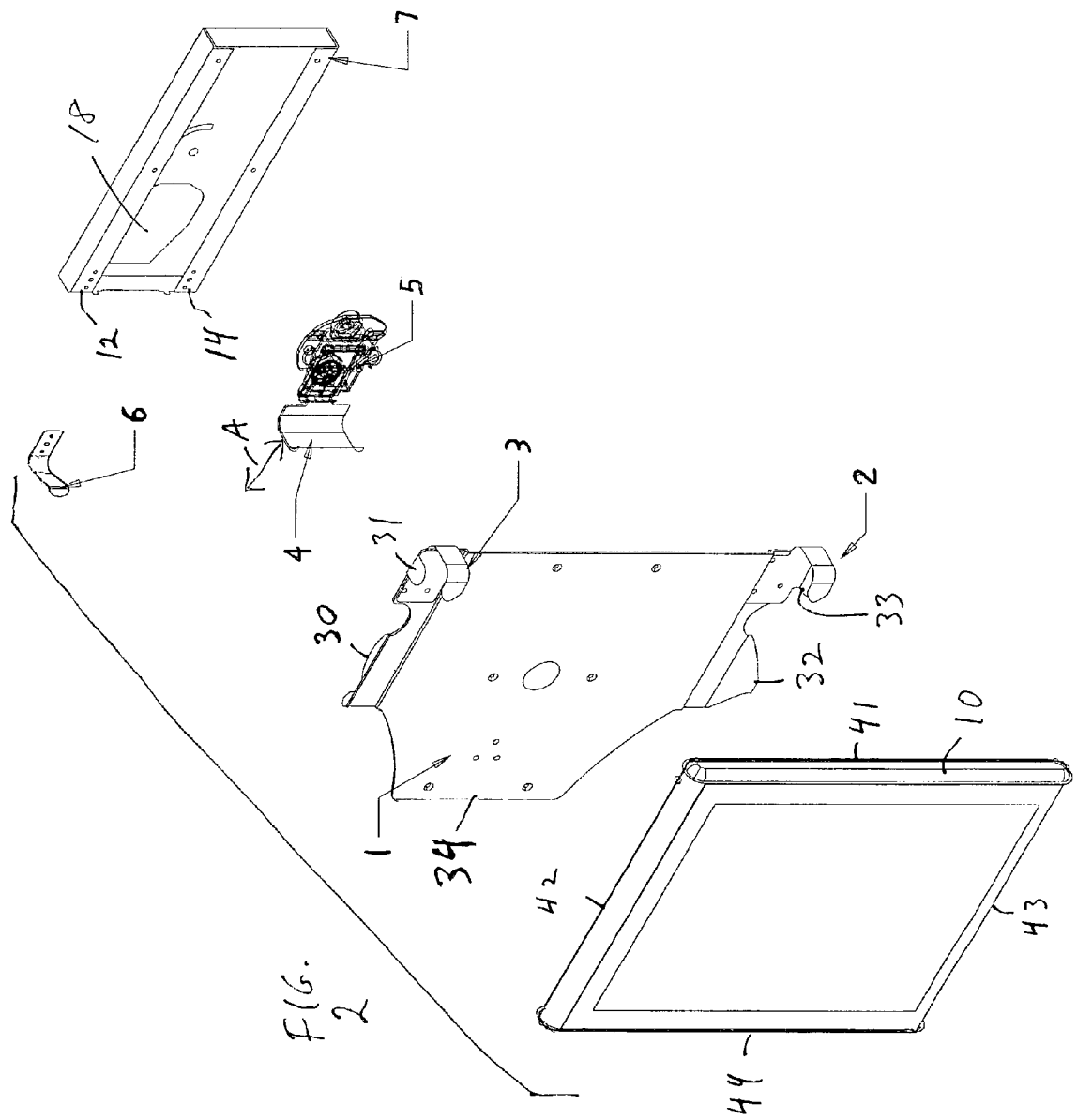

LOCKING CRADLE FOR TABLET COMPUTERS

CROSS REFERENCE TO RELATED APPLICATION

This application claims priority of Provisional application Ser. No. 60/480,935, filed on Jun. 23, 2003.

FIELD OF THE INVENTION

This invention relates to a cradle that can removably secure a tablet computer.

BACKGROUND OF THE INVENTION

Tablet computers can be used like notepads. They can accordingly be very handy for situations in which the user requires portability while at the same time direct input into a computer using a pen or stylus. By their very nature, however, tablet computers require both hands (one to hold the computer and one to write on its surface), or a table or other surface on which the tablet can be placed while it is used.

Tablet computers are expensive and in demand. However, they are small, lightweight and easily portable. Accordingly, it is easy for one person to pick up another person's tablet computer, whether by accident or not. Also, like a pad of paper or a notebook, it is easy for a user to place a tablet computer down and then walk away and forget the computer. These issues present real security concerns.

Sometimes, institutions desire that their employees to have access to tablet computers. For example, hospitals and medical facilities desire the transportability and ease of use of tablet computers. However, purchasing one computer for each user can be prohibitively expensive, particularly in light of the ease with which these computers can be lost or stolen. It is thus desirable to have a means that can allow a tablet computer to remain securely at a particular location, for use by different people or for use by the same person over extended period of time.

SUMMARY OF THE INVENTION

It is therefore an object of this invention to provide a cradle for tablet computers.

It is a further object of this invention to provide such a cradle that allows a tablet computer to be used hands-free.

It is a further object of this invention to provide such a table computer that locks the computer in place while also allowing its use.

This invention features a cradle for supporting and retaining a tablet computer having four sides, a front, and a back, the cradle comprising a base, projecting arms coupled to the base and located along at least three of the four sides of the tablet computer when the back of the computer is on the base, and one or more moveable arms that are selectively engagable along the fourth side of the tablet computer when the back of the computer is on the base, to selectively retain the tablet computer in the cradle.

At least some of the arms preferably overlap the front of the tablet computer when the back of the computer is on the base, to prevent the computer from being removed from the cradle. The base may have four sides, and there may be projecting arms located along three of the four sides. At least one projecting arm located along one side of the base is preferably a retaining arm that has an upper, inwardly-directed distal portion that overlies part of the front of the tablet computer. There may be two retaining arms projecting from the two ends of one side of the base. The base may have two pairs of generally parallel sides, and the moveable arm may be located along a side of the base that is parallel to the side of the base along which is located the at least one retaining arm. There may be projecting arms located along the two sides of the base that are adjacent to the side of the base along which is located the at least one retaining arm. These projecting arms preferably do not extend over the front of the tablet computer.

At least one movable arm may be moved by a key-operated device. The tablet computer may further comprise a support structure coupled to the base. The support structure may comprise a support arm. The cradle may further comprise a hinge between the support arm and the base, to allow the base to be pivoted relative to the support arm. The cradle may still further comprise a mechanical structure between the base and the support structure, that allows the base to be rotated relative to the support structure. The mechanical structure may provide for rotation of the base through at least about a ninety degree angle, to allow the cradle to be used with tablet computers in both portrait and landscape modes. The mechanical structure may comprise a projection that rides in a crescent-shaped slot, the slot defining the rotation end points. One or more of the projecting arms may be compliant, to more tightly grip the tablet computer.

In a more specific embodiment, the cradle comprises a base, projecting arms coupled to the base and located along at least three of the four sides of the tablet computer when the back of the computer is on the base, wherein at least some of the arms overlap the front of the tablet computer when the back of the computer is on the base, to prevent the computer from being removed from the cradle, and wherein at least one projecting arm located along one side of the base is a retaining arm that has an upper, inwardly-directed distal portion that overlies part of the front of the tablet computer, and one or more moveable arms that are selectively engagable along the fourth side of the tablet computer when the back of the computer is on the base, to selectively retain the tablet computer in the cradle.

In yet another more specific embodiment, the cradle comprises a base, a support arm coupled to the base, projecting arms coupled to the base and located along at least three of the four sides of the tablet computer when the back of the computer is on the base, wherein at least some of the arms overlap the front of the tablet computer when the back of the computer is on the base, to prevent the computer from being removed from the cradle, and wherein at least one projecting arm located along one side of the base is a retaining arm that has an upper, inwardly-directed distal portion that overlies part of the front of the tablet computer, and one or more moveable arms that are selectively engagable along the fourth side of the tablet computer when the back of the computer is on the base, to selectively retain the tablet computer in the cradle. In this embodiment, the cradle may further comprise a mechanical structure between the base and the support arm, that allows the base to be rotated relative to the support arm, wherein the mechanical structure provides for rotation of the base through at least about a ninety degree angle, to allow the cradle to be used with tablet computers in both portrait and landscape modes. This embodiment may still further comprise a hinge between the support arm and the base, to allow the base to be pivoted relative to the support arm.

BRIEF DESCRIPTION OF THE DRAWINGS

Other objects, features and advantages will occur to those skilled in the art from the following description of the preferred embodiments and the accompanying drawings in which:

FIG. 2 is an exploded view of one preferred embodiment of the tablet computer cradle of the invention;

DESCRIPTION OF THE PREFERRED EMBODIMENTS

This invention comprises a cradle that supports and secures a tablet computer, and also holds the tablet computer in a convenient position for hands-free use. The preferred embodiment of the invention comprises a cradle that grips a tablet computer along three of its four sides in a fashion that overlaps the top edge of the tablet without substantially interfering with its use. One or more movable arms are selectively engagable with the fourth side of the tablet computer. This selective engagement can be accomplished with or include a lock, to secure the tablet computer.

Figure 1:
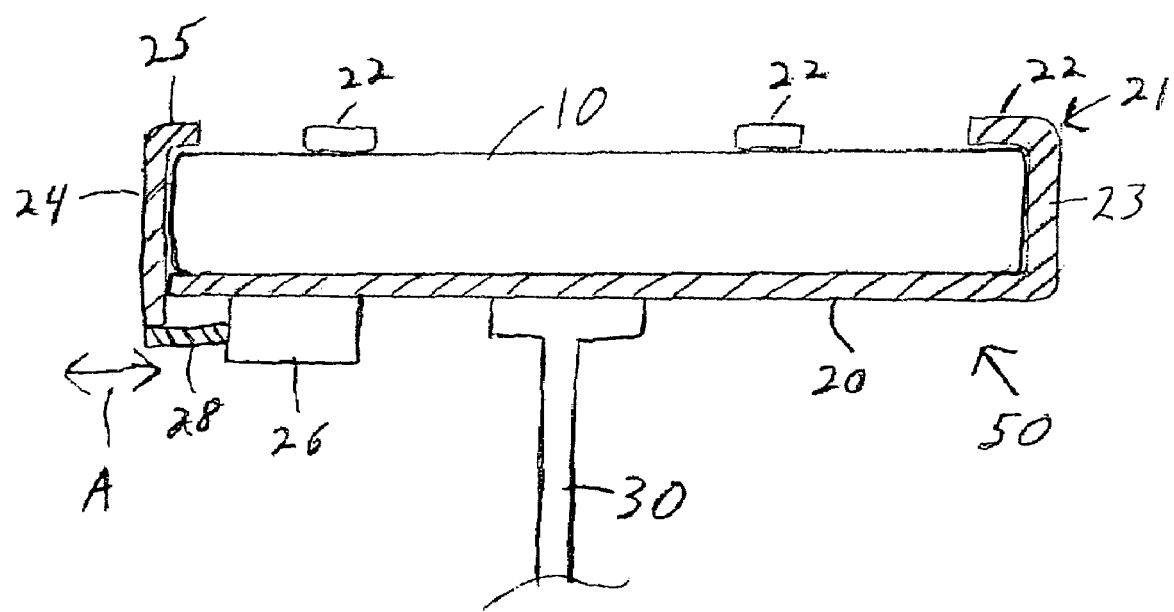
FIG. 1 is a schematic, cross-sectional view of a tablet computer cradle of this invention.

FIG. 1 is a partially cross-sectional, schematic view of cradle 50 of the invention. Tablet computer cradle 50 includes base 20 that supports tablet computer 10. One or more upwardly projecting arms 21 are arranged such that there is at least one arm on three of the four sides of tablet computer 10. Arms 21 include vertical section 23 and distal upper, inwardly-directed portion 22 that overlays the top edge of tablet computer 10 so that the tablet is fairly snuggly held within the cradle and cannot be lifted straight out. The fourth side of computer 10 is held with a moveable retaining arm 24 that may also have upper, inwardly-directed portion 25 that overlays the top edge of the computer. When member 24 is engaged as shown in FIG. 1, the tablet computer is supported on its bottom and gripped on all four edges so that it cannot substantially move. The invention thus holds the tablet computer in a manner in which it can be used.

The moveable arm 24 can be accomplished in a number of fashions. Preferably, arm 24 is moved by pawl 28 of locking device 26. Alternatively, arm 24 could be mechanically engaged with the cradle in another manner, such as with a bayonet-type mechanism. Yet another alternative would be an electrically-controlled arm that could be operated with a motor or solenoid, for example.

Cradle 50 can attach to a standard VESA flat panel monitor interface (which is typically pivotable in one dimension so that the computer can be tilted), or be custom mounted to a support arm, or custom mounted to a portable platform such as a medical cart. The attachment of the cradle is shown schematically by support arm 30 that is attached to base 20.

The preferred embodiment of the cradle of the invention is shown in exploded view in FIG. 2. Tablet computer 10 has sides 41 through 44. The cradle comprises first sheet metal member 1, second sheet metal member 7, lock 5 that operates movable arm 4, and two support brackets 6 (only one shown) that are coupled to member 7 at locations 12 and 14. Lock 5 sits in opening 18 in member 7. "C" shaped locking and support arm 4 is moved back and forth in the direction of arrow A as a key turns a lock in locking mechanism 5. This can be accomplished by coupling arm 4 to a pawl moved by locking mechanism 5. Member 1 defines the tablet support base and also fixed retaining arms 2 and 3 against which side 41 of computer 10 sits, fixed projecting arms 30 and 31 against which side 42 sits, and fixed projecting arms 32 and 33 against which side 43 sits. Retaining arms 2 and 3 overlay a portion of the top of the tablet computer. Fixed projecting arms on three sides of the tablet PC prevent the tablet from substantially moving from side-to-side and also overlay the top edge of the tablet at least on one side, so that the tablet PC must be removed from the cradle by sliding it in and out from side 34. Movable retaining arm 4 is able to move out away from the tablet (in the direction of arrow A) a sufficient distance so that the tablet can be removed from the cradle. Once the tablet is slid into the cradle, the key is used to turn the lock that pulls arm 4 back in against side 44 and overlaying the top, to snuggly hold the tablet and also lock the tablet in the cradle to prevent the tablet PC from being misplaced or stolen.

Figure 3A:
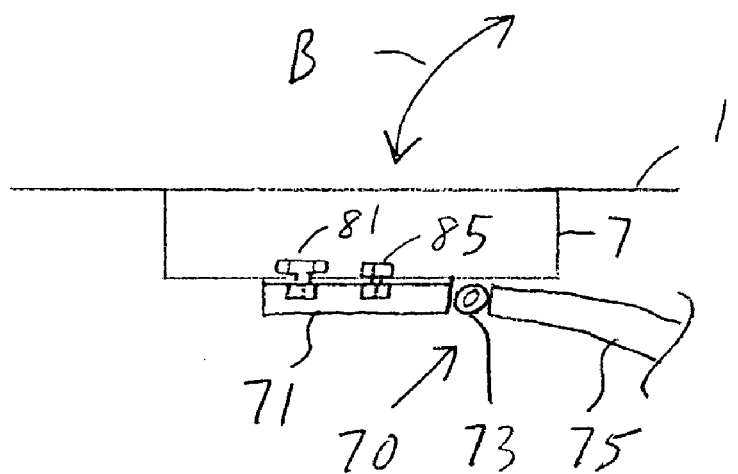
FIG. 3A is a partial schematic view of the embodiment of FIG. 2 in a different configuration.
Figure 3B:
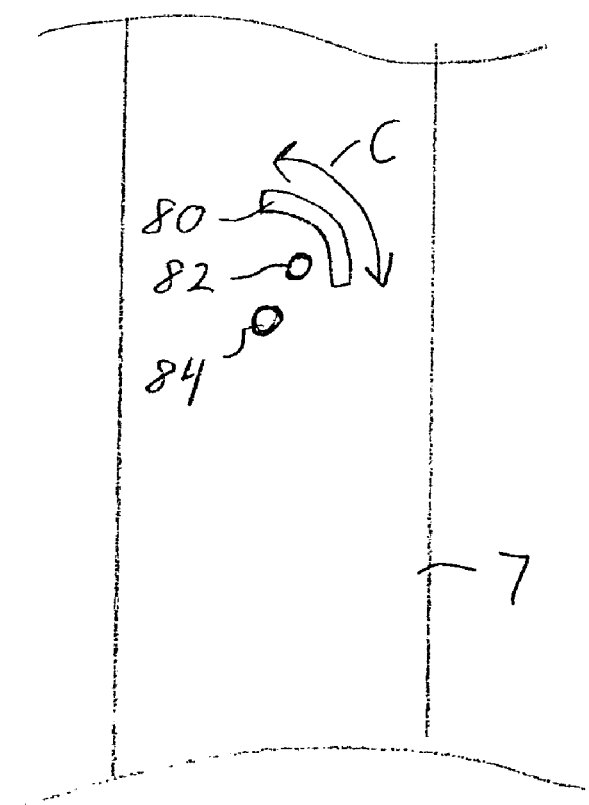
FIG. 3B is a close-up view of a portion of the cradle of FIG. 3A.

FIGS. 3A and 3B are schematic side and back views, respectively. These figures show two additional features that can be present in the invention. One is the mounting of the cradle on a support structure such as a support arm 75. The other is the arrangement for one or two-dimensional movement of the cradle relative to the support structure. Mounting member 71 can be mechanically coupled to member 7, for example by fasteners (two shown, labeled 81 and 85). Hinge 73 can couple member 71 to support arm 75. This arrangement allows member 1 (and thus a tablet computer that is coupled to the cradle of which member 1 is a part) to be rotated about an axis passing into the page along the center of hinge 73. This direction is shown by arrow B. If the support arm is attached to a table or moveable cart or the like, this pivoting action allows the tablet to be tilted for better visibility or usability by the user.

It is preferable to provide for rotational motion of the cradle (and thus the tablet captured in the cradle) about at least a ninety degree angle, so that the tablet can be used in either portrait or landscape mode. In the embodiment shown in FIGS. 3A and 3B, this is accomplished by including three mechanical fasteners (two of which 81 and 85 are shown in FIG. 3A) that couple member 71 to member 7. The fasteners pass through holes 82 and 84, and crescent-shaped slot 80, in member 7, FIG. 3B. Washers or the like between the head and nut of the bolt, or equivalent mechanical means, are used in the fastener assemblies, in order to allow the rotation of member 71 relative to member 7. The two ends of slot 80 provide stops that define the end points for the rotational motion. One or more means for providing sufficient friction can be included so that the cradle tends to remain at its desired rotational position.

Figure 4A:
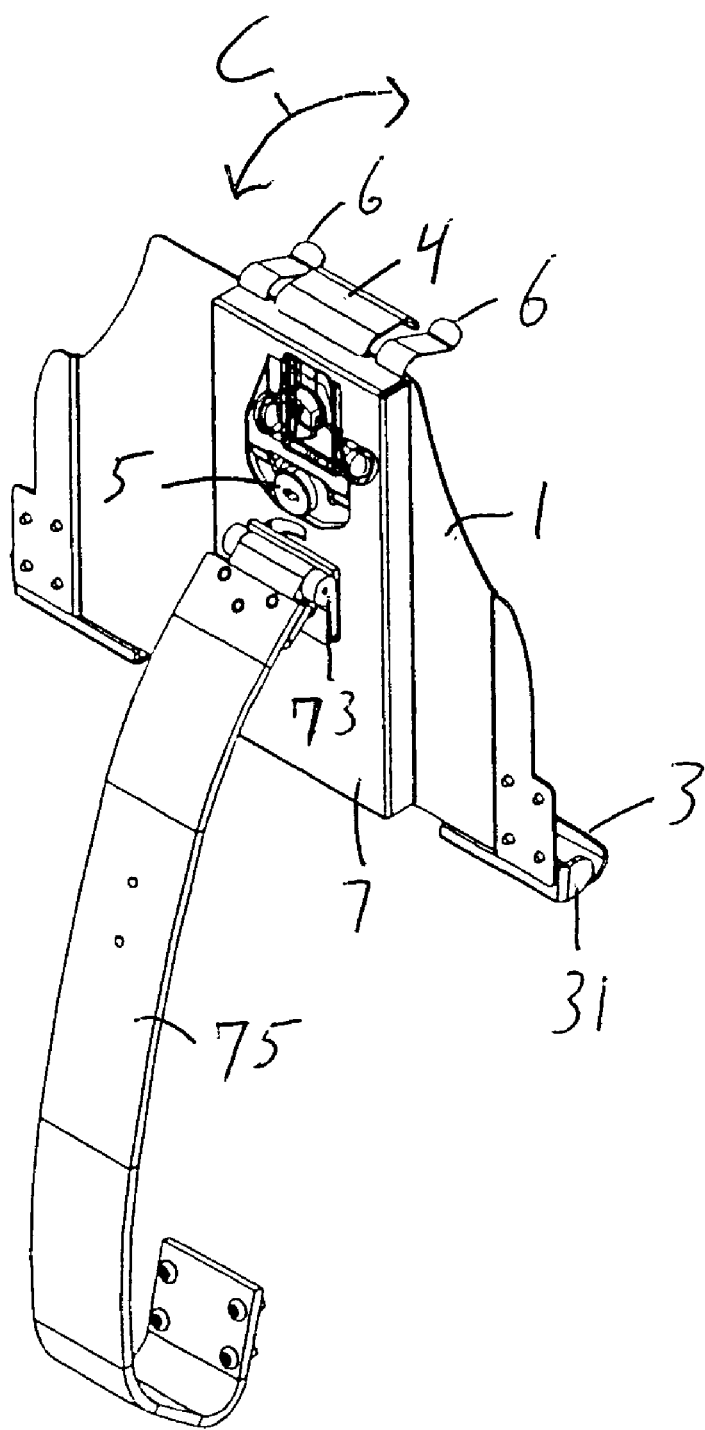
FIGS. 4A and 4B are rear three-dimensional and side views, respectively, of the embodiment of FIG. 2 pivotably mounted to a support arm.
Figure 4B:
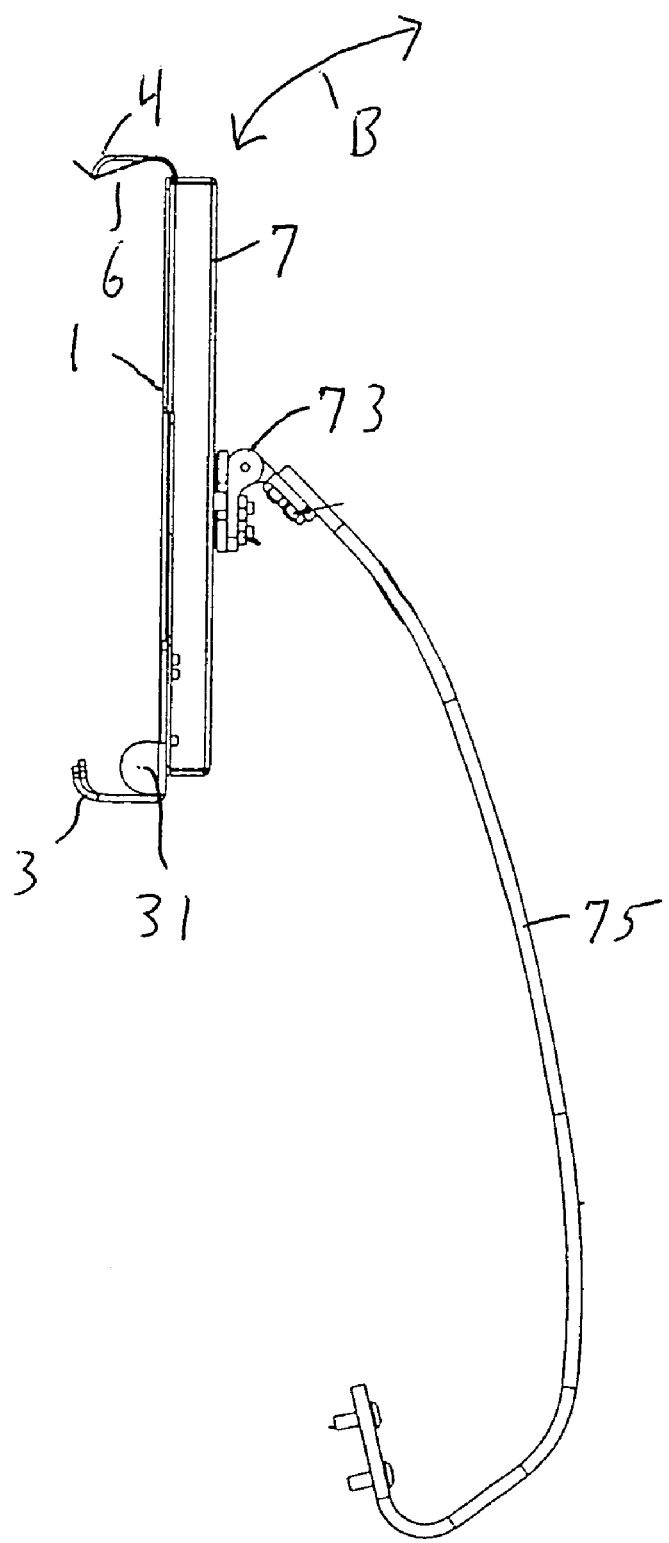

FIGS. 4A and 4B show another embodiment of the invention using the concepts of FIGS. 3A and 3B. Arm 75 is adapted to be coupled to a moveable cart, for example. This application is particularly appropriate for use in environments in which the tablet will be used along with other equipment, and the user desires to transport the tablet and other equipment, for example between rooms or across a room. One good example is a hospital environment, in which a medical professional might need to transport equipment or drugs along with a secured tablet computer from room-to-room, or just be able to move such from a corner of a room to the patient's bedside. These drawings also show a preferred form of support brackets 6 being spring fingers that help to tightly grip the tablet computer in the cradle.

Other embodiments will occur to those skilled in the art and are within the following

What is claimed is:

1. A cradle for supporting and retaining a tablet computer having four sides, a front, and a back, the cradle comprising:
   a base;
   projecting arms coupled to the base and located along at least three of the four sides of the tablet computer when the back of the computer is on the base;
   one or more moveable arms that are selectively engagable along the fourth side of the tablet computer when the back of the computer is on the base, to selectively retain the tablet computer in the cradle;
   a support structure coupled to the base; and
   a mechanical structure between the base and the support structure, that allows the base to be rotated relative to the support structure.

2. The tablet computer cradle of claim 1, wherein at least some of the arms overlap the front of the tablet computer when the back of the computer is on the base, to prevent the computer from being removed from the cradle.

3. The tablet computer cradle of claim 2, wherein the base has four sides, and there are projecting arms located along three of the four sides.

4. The tablet computer cradle of claim 3, wherein at least one projecting arm located along one side of the base is a retaining arm that has an upper, inwardly-directed distal portion that overlies part of the front of the tablet computer.

5. The tablet computer cradle of claim 4, wherein there are two retaining arms projecting from the two ends of one side of the base.

6. The tablet computer cradle of claim 4, wherein the base has two pairs of generally parallel sides, and the moveable arm is located along a side of the base that is parallel to the side of the base along which is located the at least one retaining arm.

7. The tablet computer cradle of claim 4, wherein there are projecting arms located along the two sides of the base that are adjacent to the side of the base along which is located the at least one retaining arm.

8. The tablet computer cradle of claim 7, wherein the projecting arms located along the two sides of the base that are adjacent to the side of the base along which is located the at least one retaining arm, do not extend over the front of the tablet computer.

9. The tablet computer cradle of claim 1, wherein at least one movable arm is moved by a key-operated device.

10. The tablet computer cradle of claim 1, wherein the support structure comprises a support arm.

11. The tablet computer cradle of claim 10, further comprising a hinge between the support arm and the base, to allow the base to be pivoted relative to the support arm.

12. The tablet computer cradle of claim 1, wherein the mechanical structure provides for rotation of the base through at least about a ninety degree angle, to allow the cradle to be used with tablet computers in both portrait and landscape modes.

13. The tablet computer cradle of claim 12, wherein the mechanical structure comprises a projection that rides in a crescent-shaped slot, the slot defining the rotation end points.

14. The tablet computer cradle of claim 1, wherein one or more of the projecting arms are compliant, to more tightly grip the tablet computer.

15. A cradle for supporting and retaining a tablet computer having four sides, a front, and a back, the cradle comprising:
    a base;
    a support arm coupled to the base;
    projecting arms coupled to the base and located along at least three of the four sides of the tablet computer when the back of the computer is on the base, wherein at least some of the arms overlap the front of the tablet computer when the back of the computer is on the base, to prevent the computer from being removed from the cradle, and wherein at least one projecting arm located along one side of the base is a retaining arm that has an upper, inwardly-directed distal portion that overlies part of the front of the tablet computer;
    one or more moveable arms that are selectively engagable along the fourth side of the tablet computer when the back of the computer is on the base, to selectively retain the tablet computer in the cradle; and
    a mechanical structure between the base and the support arm, that allows the base to be rotated relative to the support arm, wherein the mechanical structure provides for rotation of the base through at least about a ninety degree angle, to allow the cradle to be used with tablet computers in both portrait and landscape modes.

16. The tablet computer cradle of claim 15, further comprising a hinge between the support arm and the base, to allow the base to be pivoted relative to the support arm.

17. The tablet computer cradle of claim 15, wherein the mechanical structure comprises a projection that rides in a crescent-shaped slot, the slot defining the rotation end.

* * * * *